United States Patent [19]

Perret et al.

[11] Patent Number: 5,990,207
[45] Date of Patent: Nov. 23, 1999

[54] MIXTURES OF BITUMEN, OF POWDERED RUBBER WASTE AND OF POLYMER, EMPLOYED AS ROAD BINDER

[75] Inventors: Patrice Perret, Serquigny; Jean Lebez, Evreux; Guillaume Montignac, Bernay, all of France

[73] Assignee: Elf Atochem S.A., France

[21] Appl. No.: 09/102,780

[22] Filed: Jun. 23, 1998

[30] Foreign Application Priority Data

Jun. 24, 1997 [FR] France .................................. 97 07859

[51] Int. Cl.$^6$ ..................................... C08L 95/00
[52] U.S. Cl. .............................. 524/59; 524/60; 524/69; 525/54.5
[58] Field of Search ................................. 524/59, 60, 69; 525/54.5

[56] References Cited

U.S. PATENT DOCUMENTS

| | | | |
|---|---|---|---|
| 4,992,492 | 2/1991 | Sainton | 524/62 |
| 5,306,750 | 4/1994 | Goodrich et al. | 524/59 |
| 5,556,900 | 9/1996 | Goodrich et al. | 524/59 |
| 5,604,274 | 2/1997 | Gallagher et al. | 524/69 |

FOREIGN PATENT DOCUMENTS

| | | |
|---|---|---|
| 305225 | 3/1989 | European Pat. Off. . |
| 448425 | 9/1991 | European Pat. Off. . |
| 2580658 | 10/1986 | France . |
| WO 91/09907 | 7/1991 | WIPO . |

OTHER PUBLICATIONS

French Search Report dated Feb. 25, 1998.
"Compatibilizer for Crumb Rubber Modified Asphalt", M.E. Labib, et al. 212th American Chemical Society, National Meeting, Orlando, FL. Aug. 25–29,1996.

*Primary Examiner*—James J. Seidleck
*Assistant Examiner*—Olga Asinojsky
*Attorney, Agent, or Firm*—Bell, Boyd & Lloyd

[57] ABSTRACT

The present invention relates to mixtures of bitmen, of powdered rubber waste and of at least one copolymer (A) of an alpha-olefin and of at least one unsaturated epoxide, such that:
  the Brookfield viscosity at 180° C. according to NFT Standard 76102 (27 needle) is lower than 1150 mPa s;
  the difference in absolute value of the softening points (ring-and-ball temperature) according to NFT 66008 between the top and bottom fractions of a mixture stored for 3 days at 180° C. in a vertical tube is smaller than or equal to 5° C. These mixtures are useful as road binders.

7 Claims, No Drawings

MIXTURES OF BITUMEN, OF POWDERED RUBBER WASTE AND OF POLYMER, EMPLOYED AS ROAD BINDER

FIELD OF THE INVENTION

The present invention relates to mixtures of bitumen, of powdered rubber waste and of polymer, employed as road binder.

More precisely, it relates to mixtures in which the polymer is a thermoplastic copolymer of an alpha-olefin and of at least one unsaturated epoxide. These mixtures are very stable in storage.

BACKGROUND OF THE INVENTION

Crosslinked polymers such as rubbers are not recyclable as such, because the crosslinking or the vulcanization is irreversible, in contrast to thermoplastic polymers. Thus, worn tyres of motor vehicles and of heavy lorries and worn rubber pipes must be ground up and employed as filler. Applicant has discovered that the incorporation of these ground rubbers (referred to as "powdered rubber waste" in the text which follows) in combination with a specific copolymer, into bitumens, allows the properties of the bitumens to be improved. In particular the ring-and-ball temperature is increased and the penetration is reduced without its viscosity being increased too much.

EP 305225 describes bitumens to which have been added 8 to 10% by weight of rubber powder, 4 to 6% by weight of a heavy oil of naphtheno-aromatic nature and 2 to 3% of a catalyst. The catalyst is chosen from polymers containing ethylenic unsaturation, already recommended for incorporation into sulphur-vulcanized bitumens intended for road surfacings, for example polyisoprenes, polybutadienes, ethylene-vinyl acetate, butadiene-styrene, etc.

EP 448425 describes a process of extrusion of bitumens and of 20 to 95% by weight of grinding residues. The grinding residues are mixed beforehand with the ground bitumen and a compatibilizing agent, which may be a copolymer of ethylene, of an unsaturated ester and either of maleic anhydride or of glycidyl methacrylate. The whole is extruded and can then be employed as additive to road bitumen. These grinding residues are defined as being all the inorganic and organic materials originating from the grinding or shredding of motor vehicle carcasses, of household electrical appliances and of industrial waste.

These prior arts have not taken into account the excessively large increase in the viscosity and, above all, have not paid attention to storage stability, an essential condition for the utilization of road binders on work sites.

DESCRIPTION OF THE INVENTION

Thus the invention relates to mixtures of bitumen, of powdered rubber waste and of at least one copolymer (A) of an alpha-olefin and of at least one unsaturated epoxide, such that:
the Brookfield viscosity at 180° C. according to NFT Standard 76102 (27 needle) is lower than 1150 mPa s;
the difference in absolute value of the softening points (ring-and-ball temperature) according to NFT 66008 between the top and bottom fractions of a mixture stored for 3 days at 180° C. in a vertical tube is smaller than or equal to 5° C.

The bitumen (asphalt) employed according to the present invention is a natural constituent of mineral oils and of crude oils; it is obtained by deasphalting, for example by precipitation with propane, or by distillation of products of refining (pitch) and/or of cracking of petroleum products. It can also be obtained from tars originating from coal.

Without departing from the scope of the invention, it is also possible to employ a bitumen which is fluxed, for example with the aid of aromatic distillates or residues, or else an oxidized or air-blown bitumen.

The powdered rubber waste originates from the grinding of crosslinked (or vulcanized) objects made of polymer, such as tyres, pipes and the like.

According to the objects and their origin, the various rubbers consist of natural products (essentially polyisoprene) and/or synthetic products. Some objects contain only natural rubber, others only synthetic rubber, and others contain mixtures. Powdered rubber wastes of all compositions can be available; it is also possible to mix various such wastes without departing from the scope of the invention.

These powdered rubber wastes are generally from 0.01 to 1 mm in size.

(A) is a copolymer of an alpha-olefin including at least one unsaturated epoxide.

The unsaturated epoxide may be chosen from:
aliphatic glycidyl esters and ethers such as allyl glycidyl ether, vinyl glycidyl ether, glycidyl maleate and itaconate, glycidyl acrylate and methacrylate, and
alicyclic glycidyl esters and ethers such as 2-cyclohexene 1-glycidyl ether, diglycidyl 4,5-cyclohexenedicarboxylate, glycidyl 4-cyclohexenecarboxylate, glycidyl 5-norbornene-2-methyl-2-carboxylate and diglycidyl endocisbicyclo [2.2.1]-5-heptene-2,3-dicarboxylate.

Glycidyl (meth)acrylate is advantageously employed.

(A) also advantageously includes unsaturated carboxylic acid ester units.

The unsaturated carboxylic acid ester may be, for example, an alkyl (meth)acrylate, it being possible for the alkyl group to have up to 24 carbon atoms.

Examples of alkyl acrylate or methacrylate which can be employed are especially methyl methacrylate, ethyl acrylate, n-butyl acrylate, isobutyl acrylate and 2-ethylhexyl acrylate.

The alpha-olefin may be ethylene, propylene, 1-butene, isobutene, 1-pentene, 1-hexene, 1-decene, 4-methyl-1-butene, 4-methylpentene, 4,4-dimethyl-1-pentene, vinylcyclohexane, styrene, methylstyrene and styrene substituted with alkyls. Ethylene is advantageously employed.

The unsaturated epoxide may be grafted or copolymerized with the alpha-olefin and optionally the unsaturated carboxylic acid ester. Copolymerization is preferred.

Advantageously (A) is an ethylene/alkyl (meth)acrylate copolymer in which the alkyl has from 1 to 10 carbons/glycidyl (meth)acrylate and containing up to 65% by weight of (meth)acrylate and up to 10% by weight of epoxide.

The alkyl (meth)acrylate is preferably 9 to 40% of (A) and the epoxide 0.1 to 10%.

The copolymer (A) may be employed as a mixture with a polyolefin homo- or copolymer, ethylene-vinyl acetate copolymers or ethylene-alkyl (meth)acrylate copolymers.

The properties of the mixtures of the invention are measured according to the following methods:
The Penetration is Measured According to NFT 66004
50 g load (weight of the moving equipment and of the needle)

Temperature: 25° C.

Penetration time: 10 s

The penetration is expressed in ¹/₁₀ mm 100 g load (weight of the moving equipment and of the needle)

Temperature: 25° C.

Penetration time: 5 s.

The Softening Point, Also Called Ring-and-Ball Temperature, is Measured According to NFT 66008

Fluid: type 47 V 100 silicone oil

Temperature rise: 5° C./min.

The Brookfield Viscosity is Measured According to NFT 76102

Temperatures: 135, 140, 160, 180° C.

Needle: 27

Speeds: 2.5, 5, 10, 20, 50, 100 rev/min.

The speed adopted is that which is adapted to the viscosity of the mixture and which allows us to obtain the torque as close as possible to 50% of the maximum torque of the instrument.

Storage Stability (internal method)

Procedure pour the mixtures into Pyrex tubes age in an oven at 180° C. in a vertical position for 3 days carry out the analysis of the top and bottom parts of the sample in order to determine whether demixing has taken place. This analysis is done by difference in softening temperature (ring-and-ball).

Interpretation

What is sought is to obtain formulations which are stable in storage (without demixing), that is to say samples in the case of which there is no phase difference entailing a difference in softening temperature (ring-and-ball) of more than 5° C. between the top and the bottom of the tube.

Applicant has discovered that quantities of powdered rubber waste of the order of 20% by weight used in combination with a sufficient quantity of (A) to obtain a good storage stability produce excessively high viscosities.

Quantities of powdered rubber waste of the order of 5% by weight can be employed without copolymer (A); the mixtures are stable but the ring-and-ball temperature and the penetration resistance are insufficient.

The compositions of the invention have a ring-and-ball temperature approximately 13 to 20° C. higher than that of the bitumen alone. They also have a penetration (under 50 g) improved by approximately 15 to 35 points (that is to say in $\frac{1}{10}$ mm) relative to that of the bitumen alone, and preferably 20 to 30 points.

The powdered wastes consisting essentially of natural rubber produce good penetration resistance rather in the bottom part of the abovementioned range, but produce an improvement in the ring-and-ball temperature in the bottom part of the range. This is why preference is given to powdered wastes including a mixture of natural rubber and of synthetic rubber; these mixtures may contain 20 to 80% by weight of natural rubber.

The increase in the powdered waste content or in the copolymer (A) content produces a decrease in the penetration, accompanied by an increase in the viscosity.

The quantity of powdered rubber waste is advantageously of the order of 7 to 13% by weight (of the bitumen-powered waste-copolymer (A) mixture)

The quantity of polymer (A) is the quantity sufficient for the mixture of the invention to be stable. This quantity may be, for example, from 0.5 to 5% by weight and preferably 1 to 2% (of the bitumen-powdered waste-copolymer (A) mixture).

The quantity of units containing epoxide functional groups in (A) is advantageously from 1 to 10% by weight.

These mixtures of the invention can be produced in any mixing device and in particular the machines usually employed in the bitumen industry. The mixtures of the invention are particularly useful either as road binders, that is to say a mixture in a proportion of 5 to 10% by weight with granulates to produce road dressings or as leakproofing bitumen for structures.

EXAMPLES

The bitumen/terpolymer/recycled powdered rubber waste mixtures are produced with a Grenier-Charvet screw mixer (speed of rotation of the propeller: 400 rev/min) on a bench heated to 180° C. for two and a half hours.

The Following Products are Employed:

Bitumens

NYNAS

TOTAL

ELF

The properties are shown in Table 1.

Copolymer (A)

AX07 denotes a copolymer of ethylene, of methyl acrylate and of glycidyl methacrylate in proportions by weight 67/26/7 and with a melt index (or MI) of 6 at 190° C.—2.16 kg (ASTM D 1238).

AX01 denotes a copolymer of ethylene, of methyl acrylate and of glycidyl methacrylate in proportions by weight 71/28/1 and of MI 6 at 190° C.—2.16 kg (ASTM D 1238).

AX02 denotes a copolymer of ethylene, of butyl acrylate and of glycidyl methacrylate, in proportions by weight 68/30/2 and of MI 6 at 190° C.—2.16 kg (ASTM D 1238).

Powdered Rubber Waste

PC1 size 0.2–0.8 mm originating from heavy lorry tyres and consisting essentially of natural rubber and also includes SBR and polybutadiene.

PC2 size 0.01 to 1 mm containing 70% (weight) of natural rubber and 30% synthetic rubber (SBR, polybutadiene).

The results are collated in Table 1.

The first line "% by weight" concerns respectively % of powered rubber and % of copolymer (A).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1 (1/2)

|  | NYNAS bitumen | | ELF bitumen | |
| --- | --- | --- | --- | --- |
|  | — | PC2/AX07 | — | PC2/AX07 |
| % by weight | — | 10 | 8 + 2 | — | 10 | 8 + 2 |

TABLE 1 (1/2)-continued

|  | NYNAS bitumen | | ELF bitumen | |
| --- | --- | --- | --- | --- |
|  | — | PC2/AX07 | — | PC2/AX07 |
| Examples | 1 | 2 | 3 | 4 | 5 | 6 |
| Ring-and-ball softening temperature at T0 days ° C. | 43 | 55 | 62 | 45 | 59 | 61 |
| Ring-and-ball softening temperature at T0 + 3 days Top ° C. | — | 52 | 64 | — | 53 | 60 |
| Ring-and-ball softening temperature at T0 + 3 days Bottom ° C. | — | 59 | 63 | — | 59 | 59 |
| Delta Tba 1 Ttop − Tbottom ° C. | — | 7 | 1 | — | 6 | 2 |
| Storage stability 180° C./3 days | — | Unstable | Stable | — | Unstable | Stable |
| Penetration 1/10 mm under 50 g 25° C.-10 s | 65 | 54 | 45 | 70 | 45 | 53 |
| Penetration under 100 g 25° C.-5 s NFT66-004 | 109 | 64 | 57 | 111 | 62 | 63 |
| Brookfield viscosity mPa s | | | | | | |
| 135° C. | 450 | 2080 | 8000 | 375 | 2200 | 3700 |
| 140° C. | 375 | 1650 | 6010 | 275 | 1700 | 3060 |
| 160° C. | 150 | 680 | 2200 | 125 | 750 | 1360 |
| 180° C. Rotor 27 NFT7G-102 | 75 | 350 | 1100 | 62 | 420 | 637 |

TABLE 1 (2/2)

|  | TOTAL bitumen | | | | | | | | PC2 AX02 | PC2 AX01 |
| --- | --- | --- | --- | --- | --- | --- | --- | --- | --- | --- |
|  | PC2/AX07 | | | | PC1/AX07 | | | | | |
| % by weight | — | 10 | 8 + 2 | 5 | 4 + 1 | 10 | 9 + 1 | 8 + 2 | 8 + 2 | 8 + 2 |
| Examples | 7 | 8 | 9 | 10 | 11 | 12 | 13 | 14 | 15 | 16 |
| Ring-and-ball softening temperature at T0 days ° C. | 47 | 61 | 65 | 49 | 51 | 59 | 60 | 60 | 68 | 61 |
| Ring-and-ball softening temperature at T0 + 3 days TOP ° C. | — | 55 | 71 | 58 | 56 | 55 | 63 | 74 | 70 | 58 |
| Ring-and-ball softening temperature at T0 + 3 days Bottom ° C. | — | 65 | 69 | 58 | 58 | 65 | 64 | 70 | 68 | 62 |
| Delta Tbal Ttop − Tbottom ° C. | — | 10 | 2 | 0 | 2 | 10 | 1 | 4 | 2 | 4 |
| Storage stability − 180° C./3 days | — | Unstable | Stable | Stable | Stable | Unstable | Stable | Stable | Stable | Stable |
| Penetration 1/10 mm under 50 g − 25° C. − 10 s | 58 | 36 | 25 | 52 | 45 | 27 | 26 | 26 | 30 | 28 |
| Penetration under 100 g − 25° C. − 5 s NFT66-004 | 65 | 48 | 42 | 56 | 57 | 42 | 46 | 43 | 43 | 45 |
| Brookfield viscosity mpa s | | | | | | | | | | |
| 135° C. | 393 | 2340 | 5850 | 570 | 790 | 2050 | 2120 | 4000 | 8700 | 3700 |

TABLE 1 (2/2)-continued

| | TOTAL bitumen | | | | | | | | | |
|---|---|---|---|---|---|---|---|---|---|---|
| | PC2/AX07 | | | | | PC1/AX07 | | | PC2 AX02 | PC2 AX01 |
| 140° C. | 310 | 1840 | 4810 | 440 | 590 | 1470 | 1640 | 3200 | 6300 | 2630 |
| 160° C. | 145 | 760 | 2080 | 202 | 245 | 690 | 690 | 1380 | 2300 | 1050 |
| 180° C. | 70 | 430 | 1030 | 110 | 138 | 340 | 370 | 760 | 1100 | 520 |
| Rotor 27 NFT76-102 | | | | | | | | | | |

We claim:

1. Mixture comprising bitumen, powdered rubber waste and at least one copolymer (A) of an alpha-olefin and at least one unsaturated epoxide, wherein the quantity of copolymer (A) is from 1 to 2% by weight of the mixture and wherein:

Brookfield viscosity at 180° C. according to NFT Standard 76102 (27 needle) is less than 1150 mPa s;

difference in absolute value of softening points, ring-and-ball temperature, according to NFT 66008 between top and bottom fractions of a mixture stored for 3 days at 180° C. in a vertical tube is less than or equal to 5° C.

2. Mixture according to claim 1, wherein the copolymer (A) is a copolymer of ethylene, of an alkyl (meth)acrylate and of glycidyl (meth)acrylate.

3. Mixture according to claim 1, wherein the ring-and-ball temperature is 13 to 20° C. greater than that of the bitumen alone.

4. Mixture according to claim 1, wherein the penetration is improved by approximately 15 to 35 points, ⅒ mm, relative to that of bitumen alone.

5. Mixture according to claim 1, wherein the quantity of powdered rubber waste is from 7 to 13% by weight of the mixture.

6. Mixture according to claim 1, wherein the powdered rubber waste contains a mixture of natural rubber and of synthetic rubber.

7. Mixture according to claim 1, wherein the quantity of epoxide units is from 1 to 10% by weight of (A).

* * * * *